Dec. 6, 1932.  H. D. TAYLOR  1,890,344
DYNAMO ELECTRIC MACHINE
Filed May 20, 1929
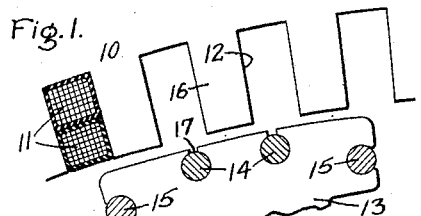
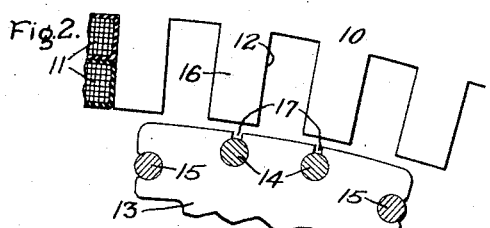
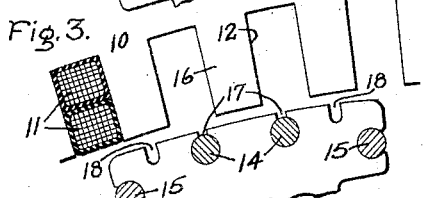
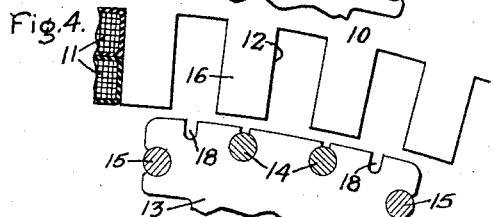
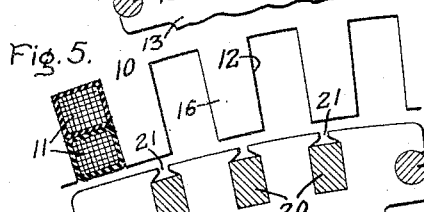
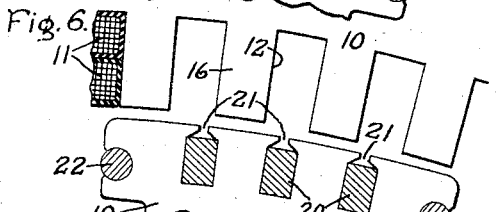
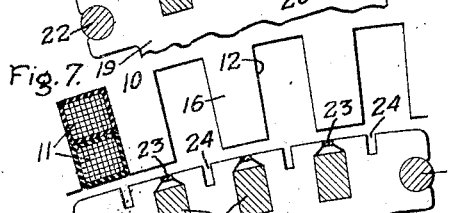
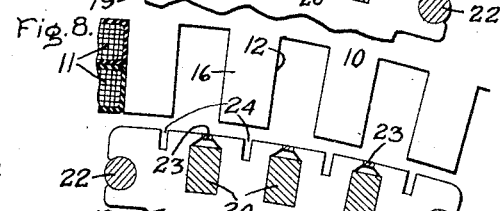
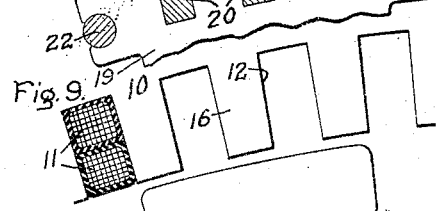
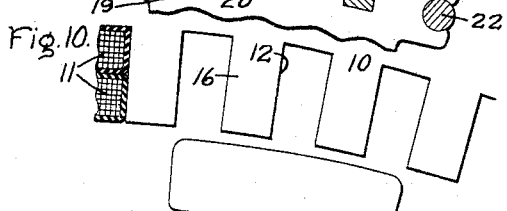
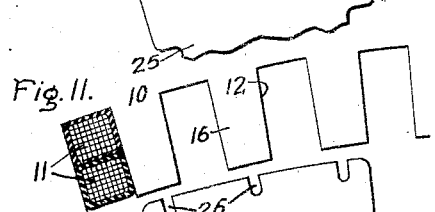
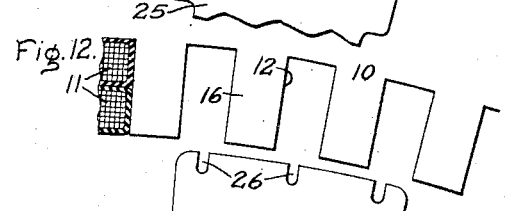
Inventor:
Hamilton D. Taylor,
by Charles E. Mullen
His Attorney.

Patented Dec. 6, 1932

1,890,344

UNITED STATES PATENT OFFICE

HAMILTON D. TAYLOR, OF SCHENECTADY, NEW YORK, ASSIGNOR TO GENERAL ELECTRIC COMPANY, A CORPORATION OF NEW YORK

DYNAMO ELECTRIC MACHINE

Application filed May 20, 1929. Serial No. 364,376.

My invention relates to dynamo electric machines.

Dynamo electric machines are frequently noisy in operation. The most troublesome source of noise is a musical note, which is often described as humming, singing, howling or whistling, sometimes of steady intensity, but usually pulsating with a frequency corresponding to the speed of the machine. The source of the noise is magnetic, and this is shown by the fact that it stops if the machines are driven with the windings thereof deenergized.

In many installations, such as auditoriums, theaters, or the like, this noise is very objectionable. It is therefore the object of my invention to reduce the noise caused by such machines during operation, and I accomplish this by arranging slots in the stationary or rotatable members of the machines so as to reduce pulsations in the radial magnetic pull between the members. I have found that such construction obviates the most troublesome source of noise in the machine.

In the drawing, Figs. 1, 5 and 9 are fragmentary sectional views of salient pole dynamo electric machines, which are noisy in operation, showing the center lines of the poles in alignment with the center lines of the teeth of the stationary members; Figs. 2, 6 and 10, are views similar to Figs. 1, 5 and 9, showing the poles of the machines rotated one-half slot pitch from the positions shown therein, so that the center lines of the poles are in alignment with the center lines of the slots of the stationary members; Figs. 3 and 4 show the machine illustrated in Figs. 1 and 2 with the poles slotted in accordance with my invention to reduce magnetic noise in the machine; Figs. 7 and 8 show how magnetic noise in the machine shown in Figs. 5 and 6 can be substantially reduced by plugging the winding slots in the face of the poles of the machine and cutting other slots therein, and Figs. 11 and 12 indicate how the noise produced in the machine shown in Figs. 9 and 10 can be reduced by providing slots in the pole faces.

Referring to the drawing, I have shown my invention in connection with several salient pole dynamo electric machines which are noisy in operation, and how slots can be cut in the poles of the machines to substantially reduce this noise. In Figs. 1 to 12 each of the machines shown includes a slotted stationary member or armature 10 having suitable winding coils 11 in the slots 12 thereof, the winding coils being omitted in some of the slots of the stationary member for convenience in illustration.

In Figs. 1 to 4 the salient pole 13 of the machine is provided with a winding having conductors 14 arranged in partially closed slots in the pole face and conductors 15 in the sides of the pole. In Fig. 1 the pole 13 is aligned with the center line of the tooth 16 of the stationary member, and in Fig. 2 it is aligned with the center line of the slot 12 one-half slot pitch from the center line of the tooth 16. In Fig. 1 the face of the pole 13 is presented to three teeth of the stationary member, and in Fig. 2, it is presented to three teeth of the stationary member but the magnetic pull between the pole and the stationary member is diminished by the partly closed slots 17 in which the conductor bars 14 are arranged. This causes variation in radial magnetic pull between the pole 13 of the machine and the stationary member 10, and as a result, when a machine is in operation, this causes vibration of the stationary member and produces a musical note.

In accordance with my invention, therefore, I cut additional open slots 18 in the face of the pole 13, which are devoid of windings, as shown in Figs. 3 and 4 of the drawing, which are arranged in such manner as to substantially reduce any variation in radial magnetic pull between the pole 13 and the stationary member 10 during rotation of the pole inside of the stationary member. In Fig. 3 the face of the pole 13 is presented to three teeth of the stationary member, but the radial magnetic pull between them is reduced by the slots 18. When the pole is moved one-half slot pitch, as indicated in Fig. 4, the open slots 18 are aligned with the slots in the stationary member so that they do not substantially affect the radial magnetic pull, but it is reduced by the slots 17 which are presented to the teeth 16 in the stationary member. It will thus be seen that the radial magnetic pull of the pole 13 of the stationary member 10 is substantially constant for all positions of the poles with respect to the stationary member so that vibration of the stationary member and the objectionable noise produced thereby is substantially obviated.

In Fig. 5 the salient pole 19 of the machine shown is provided with a winding having conductor bars 20 arranged in partially closed slots 21 in the faces of the poles and conductor bars 22 at the sides of the poles. In Fig. 5 the center line of the pole 19 is in alignment with the center line of a tooth 16 of the stationary member 10, and the face of the pole is presented to slightly more than three of the teeth 16. Upon rotation of the pole 19 one-half slot pitch from the position shown in Fig. 5 the center line of the pole is in alignment with the center line of a slot 12 of the stationary member, as shown in Fig. 6, and is presented to four of the teeth 16. In the position of the pole shown in Fig. 5, the pole is presented to a smaller number of teeth than it is in Fig. 6, and the radial magnetic pull is further reduced by the slots 21. This causes variation in radial magnetic pull between the pole 19 and the stationary member 10 which makes the machine noisy in operation.

In accordance with my invention variation in radial magnetic pull during operation of this machine is reduced so as to make the machine quiet by plugging the slots 21 with strips 23 of magnetic material, as shown in Figs. 7 and 8, or in any other suitable manner, and cutting four open slots 24 in the face of the pole which are devoid of windings and which are arranged so as to make the radial magnetic pull between the pole and the stationary member substantially constant for all positions of one with respect to the other. In Fig. 7 the open slots 24 are aligned with the slots 12 of the stationary member, and the face of the pole is presented to slightly more than three teeth of the stationary member and in Fig. 8 the face of the pole is presented to four of the teeth of the stationary member, but the radial magnetic pull is made approximately the same as when the pole is in the position shown in Fig. 7 by the reduction of the magnetic pull caused by the aligning of the open slots 24 with the teeth 16 of the stationary member.

In Fig. 9 I have shown a machine having a salient pole 25 without slots in the face thereof. It will be noted that in the position shown the center line of the pole is in alignment with a tooth 16 of the stationary member, and that the face of the pole is presented to three of the teeth 16. Upon rotation of the pole 25 one-half slot pitch from the position shown in Fig. 9 to that shown in Fig. 10 the center line of the pole is aligned with the center line of a slot 12 of the stationary member, and the face of the pole is presented to two teeth only of the stationary member. This causes wide variation in magnetic pull between the pole 25 and the stationary member 10 when it is moved from the position shown in Fig. 9 to that shown in Fig. 10 which causes the machine to be noisy in operation.

In accordance with my invention the radial magnetic pull between the pole 25 and the stationary member 10 is made substantially constant by cutting open slots 26 in the face of the pole 25 which are devoid of windings. The slots 26 are arranged so that when the face of the pole is presented to three of the teeth 16 of the stationary member that the slots reduce the magnetic pull, and so that when the center line is aligned with the center line of the slot of the stationary member, as shown in Fig. 12, that the slots 26 of the rotatable member are aligned with slots of the stationary member and do not substantially affect the magnetic pull. In this way the magnetic pull between the pole 25 and the stationary member 10 is made substantially constant for all positions of one with respect to the other, and the machine is made quiet in operation.

Although I have shown my invention in connection with several different particular forms of salient pole dynamo electric machines, I do not desire my invention to be limited to machines of this type, and I intend in the appended claims to cover all modifications which do not depart from the spirit and scope of my invention.

What I claim as new and desire to secure by Letters Patent of the United States, is:

1. A dynamo electric machine including stationary and rotatable members, windings carried by said members, one of said members having slots proportioned and arranged in such relation as to make the radial magnetic pull between the stationary and rotatable members substantially constant in all positions with respect to the stationary member so as to reduce noise produced by the machine during its operation.

2. A dynamo electric machine including slotted stationary and rotatable members, windings in said slots, said rotatable members having other slots proportioned and arranged in such relation as to make the radial magnetic pull between the stationary and rotatable members substantially constant in all positions with respect to the stationary member so as to reduce noise produced by the machine during its operation.

3. A dynamo electric machine including slotted stationary and rotatable members, and windings in said slots, the periphery of one of said members having open slots proportioned and arranged in such relation as to make the radial magnetic pull between the stationary and rotatable members substantially constant in all positions with respect to the stationary member so as to reduce noise produced by the machine during its operation.

4. A dynamo electric machine including an armature and salient poles, the faces of said poles having open slots therein proportioned and arranged in such relation as to make the radial magnetic pull between the stationary and rotatable members substantially constant in all positions with respect to the stationary member so as to reduce noise produced by the machine during its operation.

5. A dynamo electric machine including a slotted stationary member and a rotatable member having salient poles provided with winding slots in the face thereof, windings in the slots of said stationary member and in the slots in said poles, the faces of said poles having other open slots therein arranged in such relation as to make the radial magnetic pull between the stationary and rotatable members substantially constant in all positions of the rotatable member with respect to the stationary member so as to reduce noise produced by the machine during its operation.

6. A dynamo electric machine including a slotted stationary member and a rotatable member having salient poles provided with closed winding slots adjacent the faces thereof, windings in the slots of said stationary member and in the slots of said poles, the faces of said poles having other open slots therein arranged in such relation as to make the radial magnetic pull between the stationary and rotatable members substantially constant in all positions of the rotatable member with respect to the stationary member so as to reduce noise produced by the machine during its operation.

7. A dynamo electric machine including stationary and rotatable members, windings carried by said members, one of said members having slots devoid of windings and arranged in such relation as to make the radial magnetic pull between the stationary and rotatable members substantially constant in all positions of the rotatable member with respect to the stationary member so as to reduce noise produced by the machine during its operation.

8. A dynamo electric machine including slotted stationary and rotatable members, windings in said slots, said rotatable members having other slots devoid of windings and arranged in such relation as to make the radial magnetic pull between the stationary and rotatable members substantially constant in all positions of the rotatable member with respect to the stationary member so as to reduce noise produced by the machine during its operation.

9. A dynamo electric machine including slotted stationary and rotatable members, and windings in said slots, the periphery of one of said members having open slots devoid of windings and arranged in such relation as to make the radial magnetic pull between the stationary and rotatable members substantially constant in all positions of the rotatable member with respect to the stationary member so as to reduce noise produced by the machine during its operation.

10. A dynamo electric machine including an armature and salient poles, the faces of said poles having open slots therein devoid of windings and arranged in such relation as to make the radial magnetic pull between the stationary and rotatable members substantially constant in all positions of the rotatable member with respect to the stationary member so as to reduce noise produced by the machine during its operation.

11. A dynamo electric machine including a slotted stationary member and a rotatable member having salient poles provided with winding slots in the faces thereof, windings in the slots of said stationary member and in the slots in said poles, the faces of said poles having other open slots therein devoid of windings and arranged in such relation as to make the radial magnetic pull between the stationary and rotatable members substantially constant in all positions of the rotatable member with respect to the stationary member so as to reduce noise produced by the machine during its operation.

In witness whereof, I have hereunto set my hand this 18th day of May, 1929.

HAMILTON D. TAYLOR.

CERTIFICATE OF CORRECTION.

Patent No. 1,890,344.  December 6, 1932.

HAMILTON D. TAYLOR.

It is hereby certified that error appears in the printed specification of the above numbered patent requiring correction as follows: Page 3, lines 21 and 36, claims 5 and 6 respectively, after "therein" insert the words "proportioned and"; and that the said Letters Patent should be read with these corrections therein that the same may conform to the record of the case in the Patent Office.

Signed and sealed this 24th day of January, A. D. 1933.

(Seal)

M. J. Moore,
Acting Commissioner of Patents.